US011420318B1

(12) United States Patent
Harris

(10) Patent No.: US 11,420,318 B1
(45) Date of Patent: Aug. 23, 2022

(54) STURDY CONVERTIBLE WORKTABLE

(71) Applicant: William Geoffrey Harris, San Clemente, CA (US)

(72) Inventor: William Geoffrey Harris, San Clemente, CA (US)

(*) Notice: Subject to any disclaimer, the term of this patent is extended or adjusted under 35 U.S.C. 154(b) by 0 days.

(21) Appl. No.: 17/651,691

(22) Filed: Feb. 18, 2022

(51) Int. Cl.
*B23Q 3/00* (2006.01)
*B25H 1/02* (2006.01)
*B25H 1/10* (2006.01)

(52) U.S. Cl.
CPC ................. *B25H 1/02* (2013.01); *B25H 1/10* (2013.01)

(58) Field of Classification Search
CPC ............... B23H 1/02; B23H 1/10; B23H 1/04
USPC .................. 269/289 R; 108/71, 116, 132, 90
See application file for complete search history.

(56) References Cited

U.S. PATENT DOCUMENTS 583,752 A 6/1897 Johnson
1,422,613 A 7/1922 Ogden
1,747,691 A 2/1930 Bellows
2,637,358 A 5/1953 Larson
4,011,821 A 3/1977 Neal
4,102,555 A 7/1978 Tobolski
4,155,386 A 5/1979 Welsch
4,739,580 A * 4/1988 Simmons ............ A47B 3/0818 108/50.13
4,838,179 A * 6/1989 Bing ...................... A47B 25/00 108/90
5,865,129 A 2/1999 Samples
6,029,721 A 2/2000 O'Banion
6,109,187 A 8/2000 Cottle
6,763,770 B2 7/2004 Marrujo
9,215,923 B1 12/2015 Boone
2016/0051049 A1* 2/2016 Peery .................. A47B 13/083 108/91

FOREIGN PATENT DOCUMENTS

FR 2937841 A1 5/2010
KR 101960251 B1 3/2019

* cited by examiner

*Primary Examiner* — Joseph J Hail
*Assistant Examiner* — Shantese L McDonald
(74) *Attorney, Agent, or Firm* — Jafari Law Group, Inc.

(57) ABSTRACT

The present invention discloses a convertible worktable convertible between a storage configuration and an assembled use configuration. The worktable comprises a tabletop has a top surface and a bottom surface, a top frame fixed to the bottom surface of the tabletop and a bottom frame being spaced apart and coaxial to the top frame. The bottom frame having a first side and a second side opposite to the first side. The worktable further comprises a plurality of legs fastened to the top frame and extends beyond and in contact with the bottom frame. A fastener assembly detachably fastens the plurality of legs to the top frame and the bottom frame and defines an assembled use configuration. The fastener assembly allows detachment of the plurality of legs from the top and bottom frame, fastens the plurality of legs and the bottom frame alongside the top frame, and defines a storage configuration.

20 Claims, 10 Drawing Sheets

STURDY CONVERTIBLE WORKTABLE

TECHNICAL FIELD

The present disclosure relates generally to a worktable, and more particularly, to a convertible, sturdy worktable that can be assembled and reassembled between an assembled use configuration and a storage configuration without the use of tools.

BACKGROUND

A convertible worktable is a worktable that can be disassembled and reassembled to provide a convenient working-surface that can be carried with the user to various locations. There are abundant examples of collapsible, convertible, foldable, and knock down worktables known in the art. In general, they tend to be quite specific in their purposes so that they may, for example, be limited in size for portability, or not require a great deal of stability or they may, as in the case of some knock down tables, be rather complicated with many parts and are intended to be assembled and left that way once they reach their destinations, and are not intended to be knocked down and reassembled on a regular basis.

Conventional solutions include a multi-purpose, convertible table, which can be used as a desk or a worktable, but it was not engineered to be completely dismantled or to be very sturdy for heavy use as it lacks support for the legs at the bottom. Also, there is a whole genre of worktables, or workbenches that are based on the sawhorse theme. It is evident that these types of worktables are not intended to replace the more rugged permanent, heavy-duty types of worktables, even though their usefulness and portability is evident.

Other examples of worktables which are referred to as knockdown worktables may have legs and/or tops or other parts that can be removed for shipping and assembly when they reach their destination, but after being reassembled at their destination, they are intended to remain in the assembled configuration permanently.

Therefore, there still exists a need for a convertible sturdy worktable that can be conveniently switched into an assembled use configuration and a compact storable configuration.

SUMMARY

The present invention discloses a convertible worktable convertible between a storage configuration and an assembled use configuration.

The worktable comprises a top frame unit including a planar tabletop generally square or rectangular in shape, and a top frame or skirt permanently attached to the bottom surface of the tabletop. The worktable further comprises a separate bottom frame unit which is attached to the legs during assembly.

The worktable further comprises a plurality of legs generally four in number which attach to the inside of the top frame at the corners and against the bottom surface of the tabletop. The worktable further comprises a fastener assembly that detachably fastens the plurality of legs to the top frame and the bottom frame and defines an assembled use configuration. The fastener assembly further allows detachment of the plurality of legs from the top and bottom frame and fastening of the plurality of legs and the bottom frame alongside the top frame, thereby defining a storage configuration.

In one embodiment, the top frame and the bottom frame have a rectangular configuration. In another embodiment, the top frame and the bottom frame have a square configuration.

In the storage configuration, the bottom frame is positioned within the top frame, the first pair of legs is placed outside the top frame against the table top in the free space on one side and the second pair of legs placed in the second free space on the other side, and the bottom frame is placed inside the top frame and the whole unit is bolted or fastened together with bolts or fasteners extending through both legs and both frames on both sides of the table.

The worktable further comprises a fastener assembly comprising a plurality of fastening holes predrilled into the top frame, the bottom frame and the plurality of legs. In one embodiment, the fastener assembly comprises one or more fastening holes in the top frame, the bottom frame and the plurality of legs. The fastener assembly further comprises a plurality of coarse threaded hex bolts with wingnuts and washers.

In one embodiment, at least two fastening holes is provided on the top frame and legs for fastening each legs the top frame. In one embodiment, at least one fastening hole is provided on the bottom frame and the bottom portion of the legs for fastening each legs to the bottom frame.

In exemplary embodiments, a convertible worktable that is convertible into an assembled use configuration and a storage configuration, includes: a plurality of legs and a plurality of fasteners; a top frame unit including a planar tabletop surface and a top frame attached underneath the planar tabletop surface, the top frame having a top frame perimeter that is smaller and similar to a perimeter of the planar tabletop surface such that a perimetrical surface between the top frame and an edge of the planar tabletop surface is formed, at least a portion of the perimetrical surface configured to store the plurality of legs of the convertible worktable in the storage configuration and configured to provide space for clamps or mounting tools in the assembled use configuration, wherein: a first set of holes disposed on a first set of opposite sides of the top frame align with a first set of holes on a terminal end of each of the plurality of legs to convert the convertible worktable to the assembled use configuration, and a second set of holes disposed on a second set of opposite sides of the top frame align with a second set of holes on a length of each of the legs to convert the convertible worktable to the storage configuration; and a removable bottom frame having a bottom frame perimeter that is smaller and similar to the top frame perimeter, wherein: the bottom frame is spaced apart and coaxial to the top frame and a set of gaps is formed between opposite sides of the removable bottom frame and the top frame; a third set of holes disposed on a first set of opposite sides of the bottom frame align with a fourth set of holes on an opposite terminal end of each of the plurality of legs when the convertible worktable is converted to the assembled use configuration, and a fifth set of holes disposed on a second set of opposite sides of the bottom frame align with the second set of holes of the top frame when the convertible worktable is converted to the storage configuration.

In some exemplary embodiments, when the convertible worktable is in the storage configuration, at least some of the plurality of fasteners traverse through the second set of holes on the length of each of the legs, the second set of holes disposed on the second set of opposite sides of the top frame, and the fifth set of holes disposed on the second set of opposite sides of the bottom frame so that the plurality of legs is secured underneath the planar tabletop surface and attached to the top frame and the bottom frame.

In some exemplary embodiments, when the convertible worktable is in the assembled use configuration, at least some of the plurality of fasteners are traverse through the first set of holes disposed on the first set of opposite sides of the top frame, and the first set of holes on the terminal end of each of the plurality of legs so that the that the plurality of legs are vertically secured to the top frame of the top frame unit of the convertible worktable.

The above summary contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Figure 1:
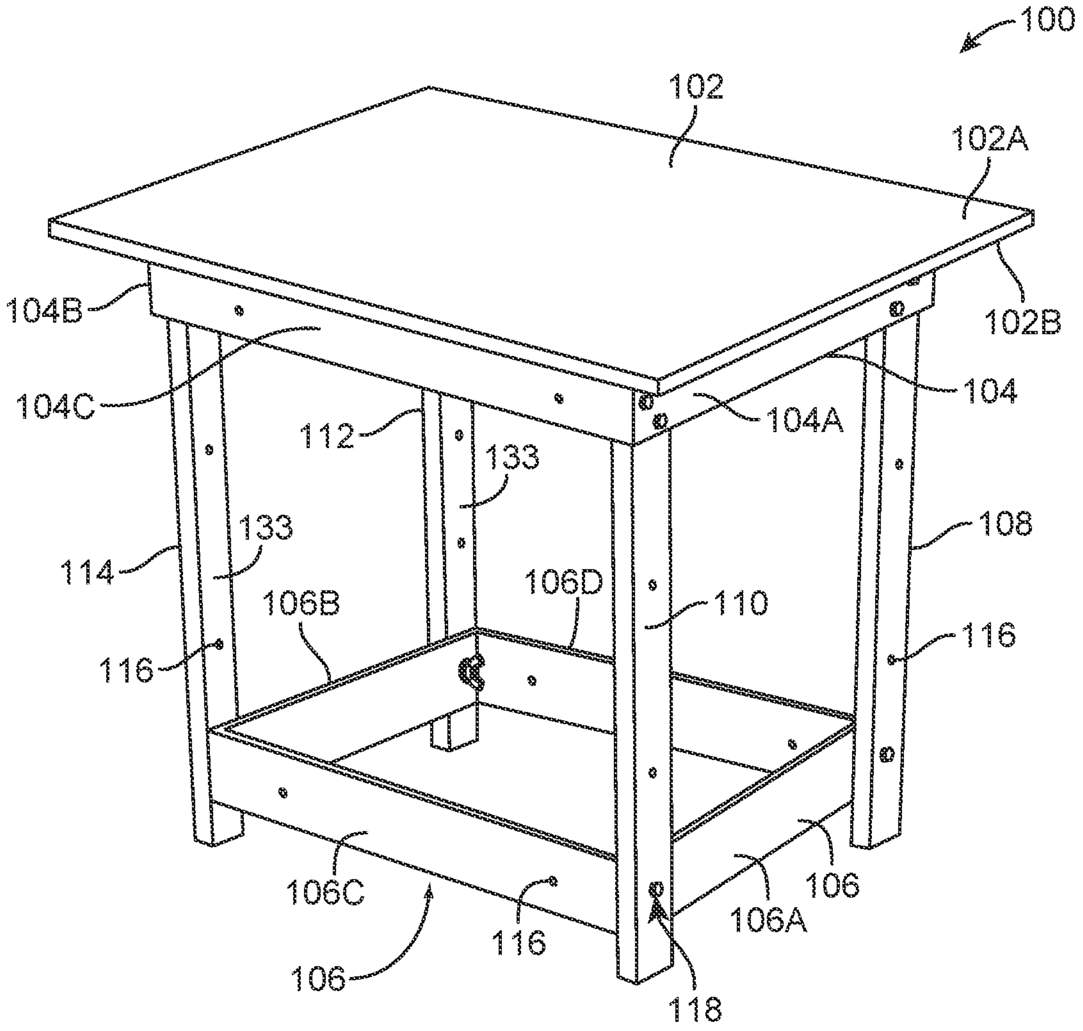
FIG. 1 exemplarily illustrates a perspective view of a convertible table in assembled use configuration, according to an embodiment of the present invention.

FIG. 1 illustrates a perspective view of a rugged, sturdy, convertible table 100 that could be assembled and reassembled between a assembled use configuration and a storage configuration without the use of tools. The storage configuration is a compact, space-saving, and a portable storage configuration of the worktable 100. The convertible table 100 comprises a planar tabletop 102, a top frame 104, a bottom frame 106, a plurality of legs 108, 110, 112, 114 and a fastener assembly.

In one embodiment, the tabletop 102 generally has a planar surface, and a rectangular configuration. In another embodiment, the tabletop 102 may have any other type of configuration, and not limited to the rectangular configuration has the planar surface as shown in FIG. 1. The tabletop 102 has a top surface 102*a* and a bottom surface 102*b*. The top frame 104 is fixed to the bottom surface 102*b* of the tabletop 102. In one embodiment, the top frame 104 is permanently attached to the tabletop 102. The bottom frame 106 is spaced apart and coaxial to the top frame 104. The plurality of legs 108, 110, 112, 114 including a first pair of legs 108, 110 and a second pair of legs 112, 114. The first pair of legs 108, 110 is mounted to a first side of 104*a*, 106*a* of the top frame 104 and the bottom frame 106, respectively. Further, the first pair of legs 108, 110 extends beyond the bottom frame 106. The second pair of legs 112, 114 is mounted to a second side of 104*b*, 106*b* of the top frame 104 and the bottom frame 106, respectively. Further, the second pair of legs 112, 114 extends beyond the bottom frame 106.

The plurality of legs 108, 110, 112, 114 are fastened to the top frame 104 and the bottom frame 106 via the fastener assembly. The bottom frame 106 serves as a box stretcher creating a box like rigidity to the whole worktable 100 in assembled use configuration. The fastener assembly includes a plurality of fastening holes 116 and a plurality of fastener member 118.

As may be appreciated from this view, in some exemplary embodiments, when the convertible table 100 is in the assembled use configuration, as shown in FIG. 1, the bottom frame 106 is measured to fit up against the inward facing sides 133 of each of the legs (108, 110, 112, and 114) on two opposite sides 106A and 106B. On the other two opposite sides 106C and 106D, the bottom frame 106 is measured to be equal to the length of the inside of the top frame 104.

Figure 2:
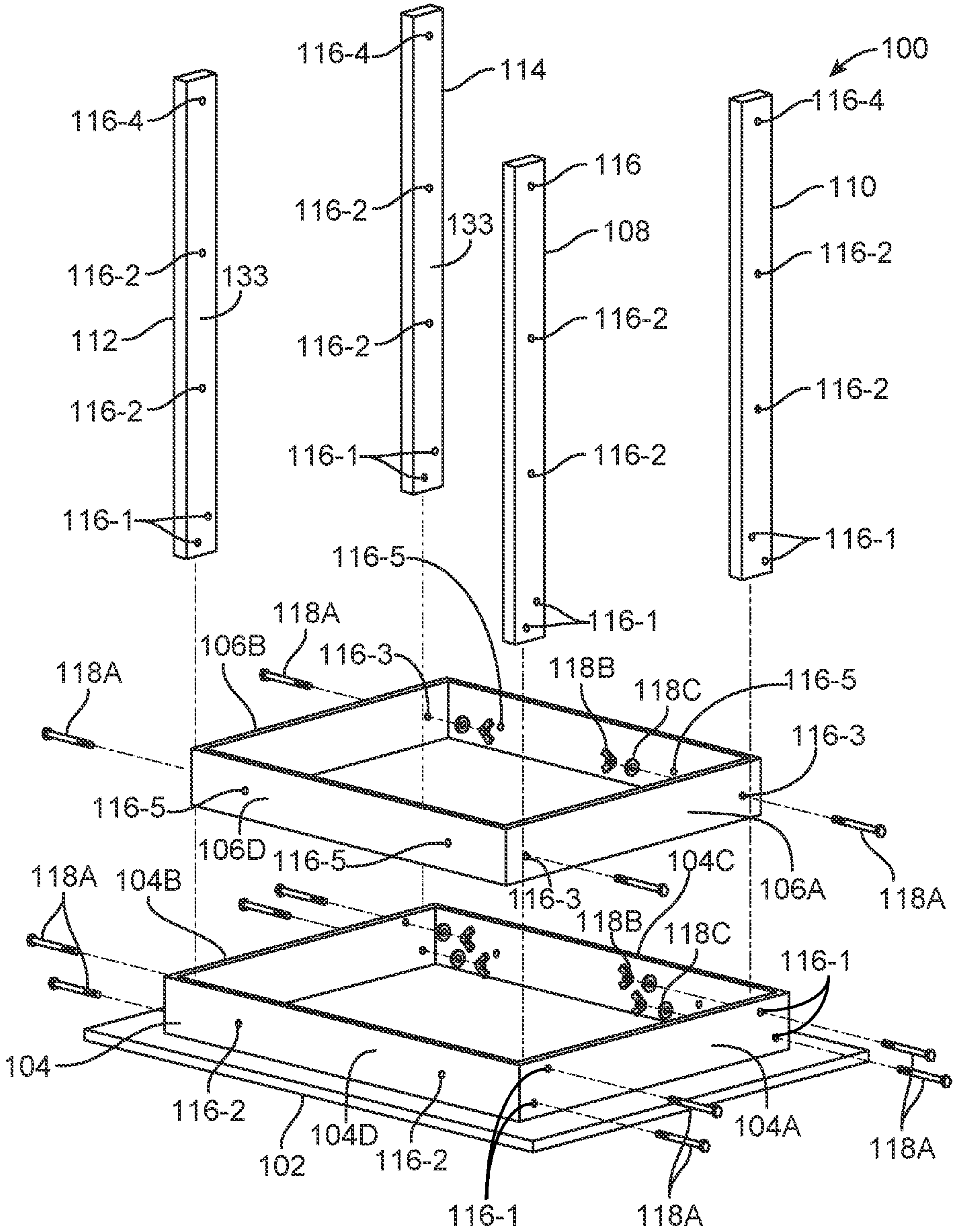
FIG. 2 exemplarily illustrates an exploded view of the convertible table of FIG. 1.

FIG. 2 exemplarily illustrates an exploded view of the convertible table 100 of FIG. 1. The top frame 104 mounted to the tabletop 102. During assembly of the convertible table 100, each of legs 108, 110, 112, 114 are positioned at the respective positions. For example, the first pair of legs 108, 110 are positioned on the first side 104*a* of the top frame 104 and the second pair of legs 112, 114 are positioned on the second side 104*b* of the top frame 104. At least two fastening holes 116 for each leg are provided on the top frame 104, and legs 108, 110, 112, 114 for fastening each legs 108, 110, 112, 114. The fastener member 118 is used to fasten the legs 108, 110, 112, 114 to the top frame 104. Each fastener member 118 comprises a hex bolt 118*a* with a wingnut 118*b* and at least one washer 118*c*.

At least one fastening hole 116 is provided on the bottom frame 106 and the bottom portion of the legs 108, 110, 112, 114 for fastening each legs 108, 110, 112, 114 to the bottom frame 106. In exemplary embodiments, there are at least four holes 116. The fastener member 118 is used to fasten the legs 108, 110, 112, 114 to the bottom frame 106. The fastener member 118 is used to fasten the legs 108, 110, 112, 114 to the bottom frame 106. Thereby, the table 100 is configured to the assembled use configuration.

Figure 10:
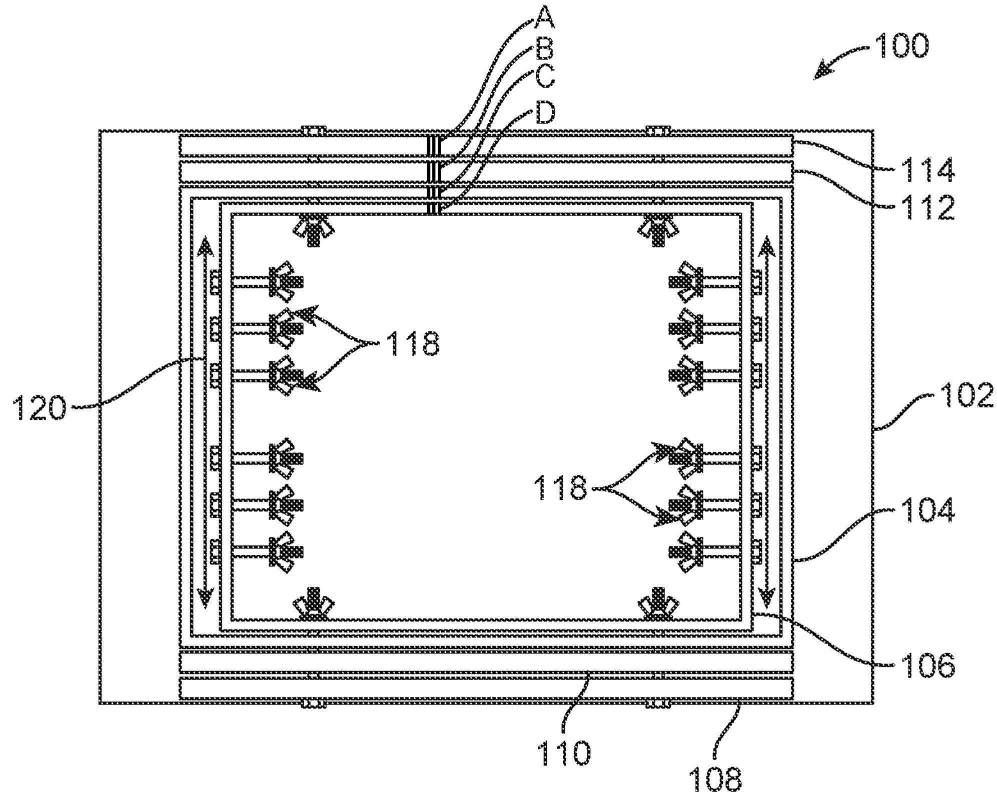
FIG. 10 exemplarily illustrates a bottom view of the convertible table of FIG. 1 in storage configuration.

As may be appreciated from this view, in some exemplary embodiments, when the convertible table 100 is in the storage configuration, as shown in FIG. 10 (but for this brief discussion with reference also to FIG. 2), the bottom frame 106 is measured to fit snugly against the top frame 104 on both opposite sides on which the legs are not mountable on, and is measured on the two opposite sides where the legs are to be mounted to a length that is equivalent to the distance between the legs on opposite sides.

Figure 3:
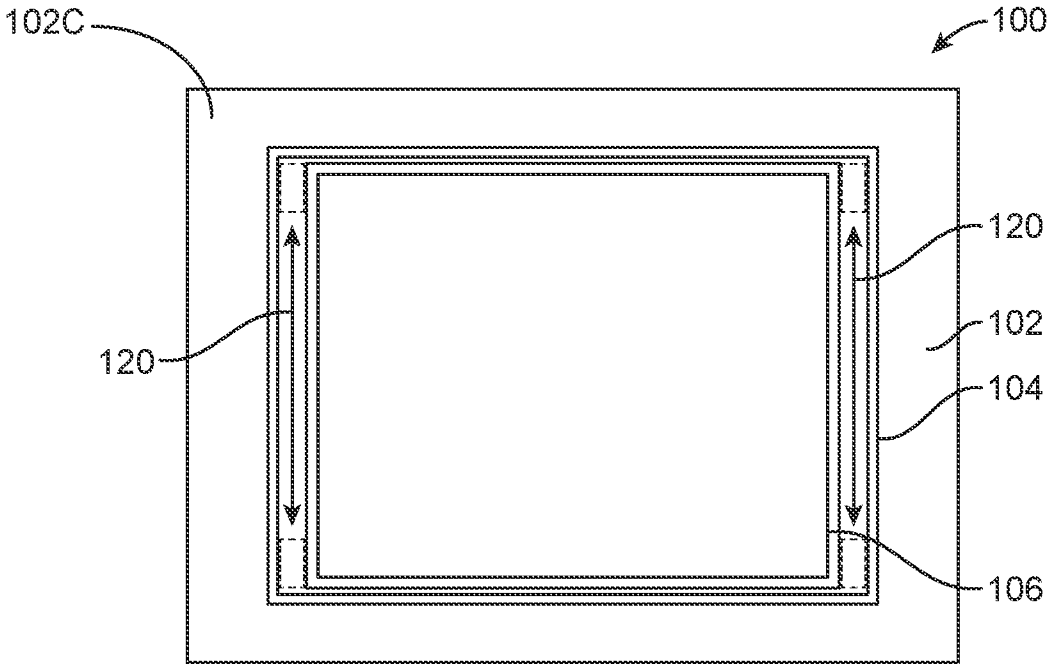
FIG. 3 exemplarily illustrates a bottom view of the convertible table, in which the legs are positioned on the two opposing sides of the table.

FIG. 3 exemplarily illustrates a bottom view of the convertible table 100 in a rectangular shape configuration, in which the legs 108, 110, 112, 114 are positioned on the two opposing sides of the table 100. Further, the top frame 104 has a first size and the bottom frame 106 has a second size. The second size and the first size are different. In this embodiment, as shown in FIG. 3, the second size is smaller than the first size. Thus, allows the bottom frame 106 to fit within the top frame 104. FIG. 3 further shows a gap 120 between the top frame 104 and the bottom frame 106, and between legs 108, 110, 112, 114 of each pair 108, 110, 112, 114.

Figure 4:
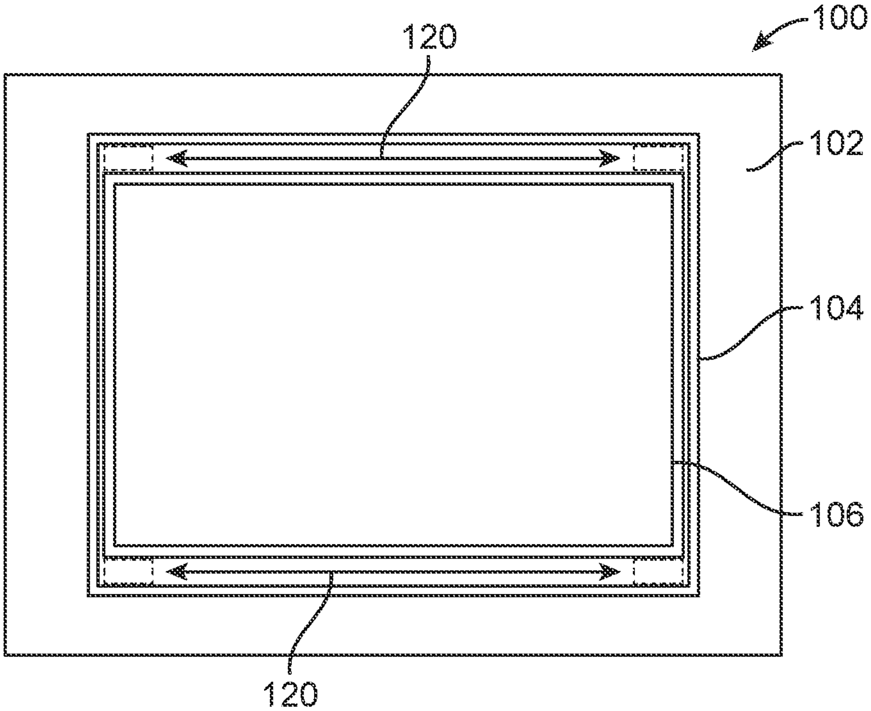
FIG. 4 exemplarily illustrates a bottom view of the convertible table, in which the legs are positioned on the top and bottom sides of the table.

FIG. 4 exemplarily illustrates a bottom view of the convertible table 100 also in a rectangular shape configuration, in which the legs 108, 110, 112, 114 are positioned on the top and bottom sides of the table 100. Similar to FIG. 3, the top frame 104 has the first size and the bottom frame 106 has the second size. The second size and the first size are different. In this embodiment, as shown in FIG. 4, the second size is smaller than the first size. Thus, allows the bottom frame 106 to fit within the top frame 104. FIG. 4 further shows the gap 120 between the top frame 104 and the bottom frame 106, and between legs 108, 110, 112, 114 of each pair 108, 110, 112, 114. The gap 120 may be used for storage of fastener members 118 that are not required in storage configuration. The unused fastening holes 116, also referred as storage holes 116, in the bottom frame 106 during storage configuration may be used to fasten and store unused fastener members 118.

Figure 5:
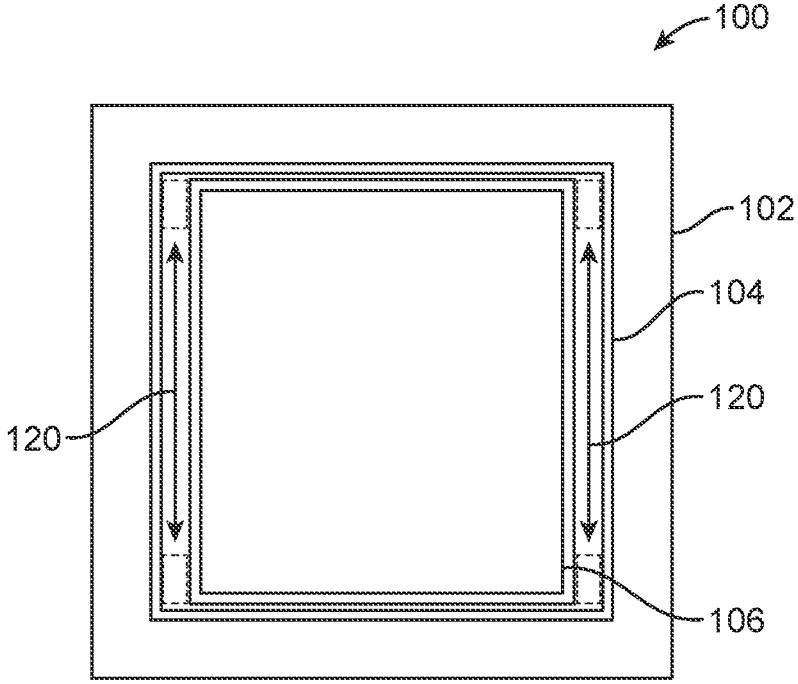
FIG. 5 exemplarily illustrates a bottom view of the convertible table having a square shaped configuration.

FIG. 5 exemplarily illustrates a bottom view of the convertible table 100 has a square shaped configuration. In one embodiment, the convertible table 100 may have any other type of shape. In one embodiment, the worktable 100, except for fastener members 118, may be made of wood, or some type of synthetic or composite material. The cutting and joining of the parts of the worktable 100 can be done by methods commonly known by those reasonably familiar with the art and with the use of a power miter saw, and usually will involve the use of templates to achieve uniformity in the drilling of the fastening holes 116 and alignment of the top frame 104 and the tabletop 102, as well as steps to make sure that all parts that need to be exactly replicated are cut to the right length. As may be appreciated from this view, each of the legs are configured to fit in spaces 120A against the top frame 104 on the top terminal end of each of the legs, and on the exterior of the bottom frame on bottom terminal ends.

Figure 6:
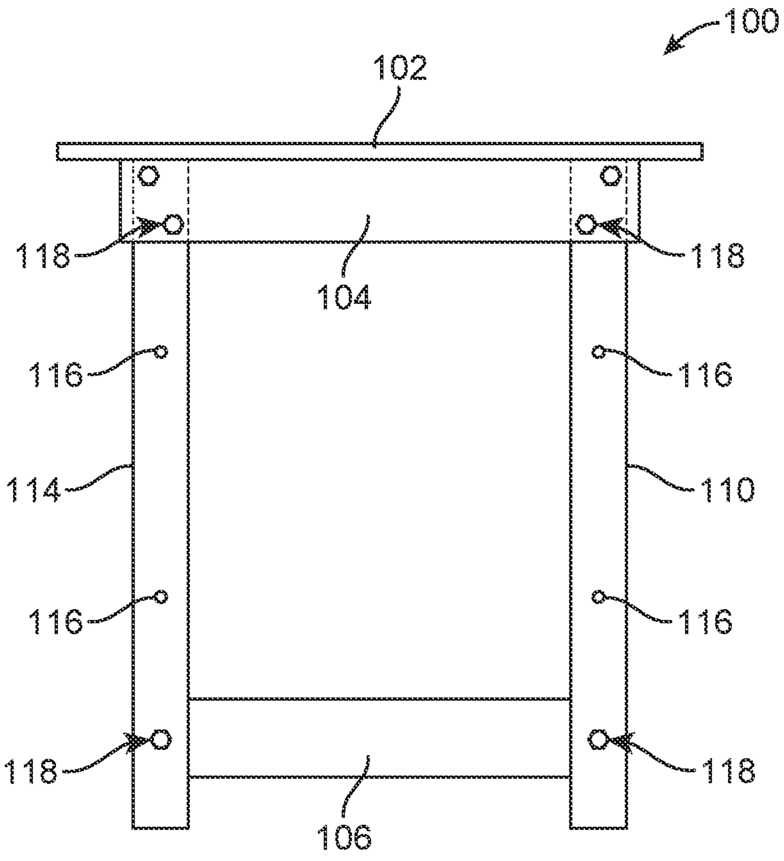
FIG. 6 exemplarily illustrates a side view of the convertible table of FIG. 1.

FIG. 6 exemplarily illustrates a side view of the convertible table 100 of FIG. 1, in assembled use configuration. The table 100 comprising a tabletop 102, top frame 104 mounted to the tabletop 102 and a bottom frame 106 coaxial and spaced-apart from the top frame 104. The plurality of legs 108, 110, 112, 114 fastened to the top frame 104 in such a way that legs 108, 110, 112, 114 are fastened and in contact to the interior side of the top frame 104. Further, the plurality of legs 108, 110, 112, 114 fastened to the bottom frame 106 in such a way that legs 108, 110, 112, 114 are fastened and in contact to the exterior side of the bottom frame 106.

Figure 7:
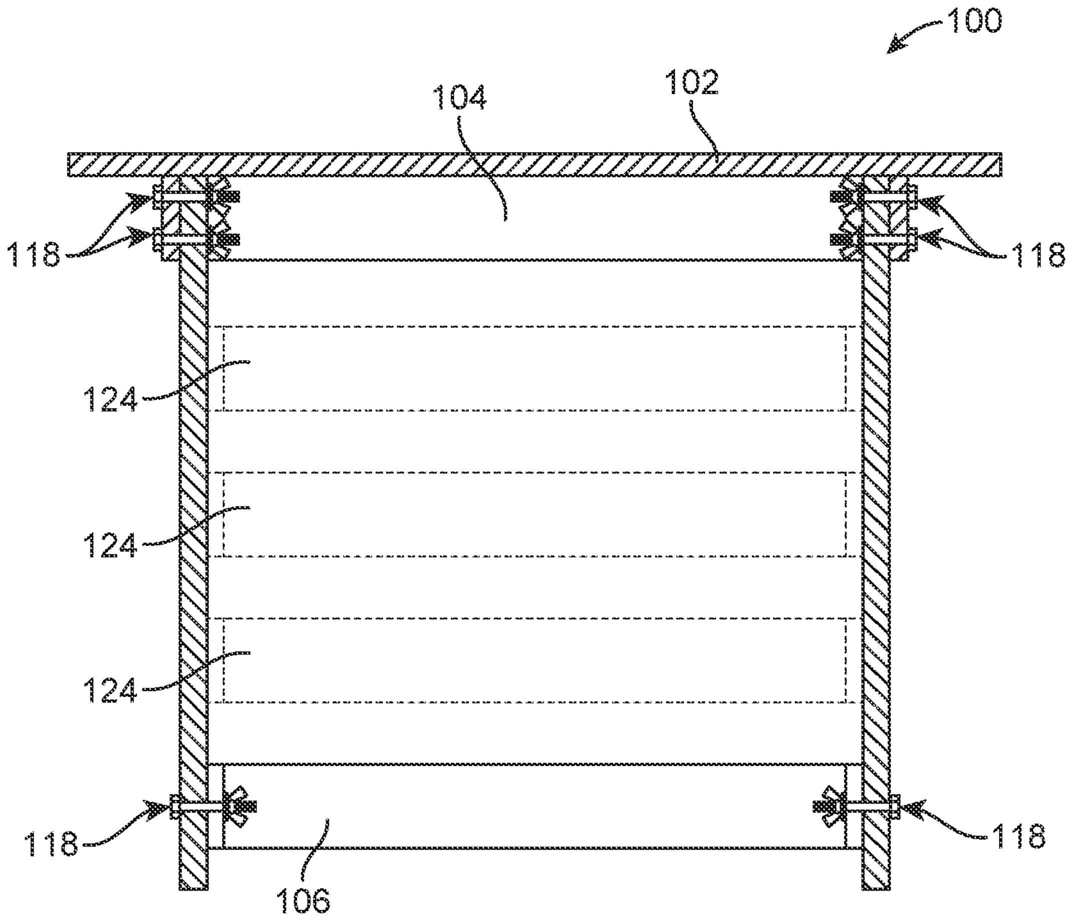
FIG. 7 exemplarily illustrates a cross-sectional view, along a side of the convertible table of FIG. 1.

FIG. 7 exemplarily illustrates a cross-sectional view, along a side of the convertible table 100 of FIG. 1. The bottom frame 106 could be fastened at any length of the legs 108, 110, 112, 114. At least four fastening holes 116 along the length of the legs 108, 110, 112, 114. The bottom frame 106 could be mounted or fastened to any of the four fastening holes 116 of the legs 108, 110, 112, 114 via the fastening member 118. Imaginary dotted lines 124 are used to represent the different positions that the bottom frame 106 could be fastened to the legs 108, 110, 112, 114.

Figure 8A:
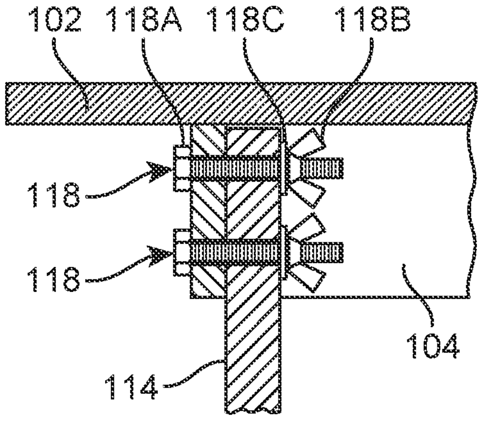
FIG. 8A exemplarily illustrates a cross-sectional view of a leg fastened to a top frame of the convertible table of FIG. 1.

FIG. 8A exemplarily illustrates a cross-sectional view of the leg 114 fastened to the top frame 104 of the convertible table 100 of FIG. 1. The leg 114 positioned at the interior side of the top frame 104 in such way the fastening holes 116 of both the leg 114 and the top frame 104 are in line. Thereafter, the leg 114 and the top frame 104 are fastened using the hex bolt 118*a* with the wingnut 118*b* and the washer 118*c*.

Figure 8B:
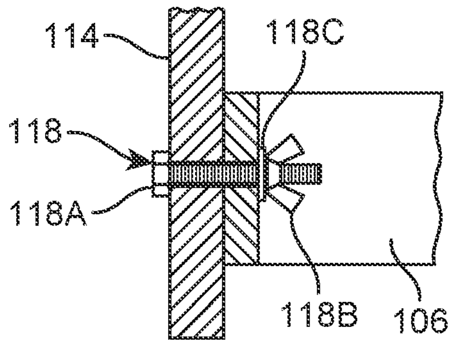
FIG. 8B exemplarily illustrates a cross-sectional view of a leg fastened to a bottom frame of the convertible table of FIG. 1.

FIG. 8B exemplarily illustrates a cross-sectional view of a leg fastened to the bottom frame 106 of the convertible table of FIG. 1. The leg 114 positioned at the exterior side of the bottom frame 106 in such way the fastening holes 116 of both the leg 114 and the bottom frame 106 are in line. Thereafter, the leg 114 and the bottom frame 106 are fastened using the hex bolt 118*a* with the wingnut 118*b* and the washer 118*c*.

Figure 9A:
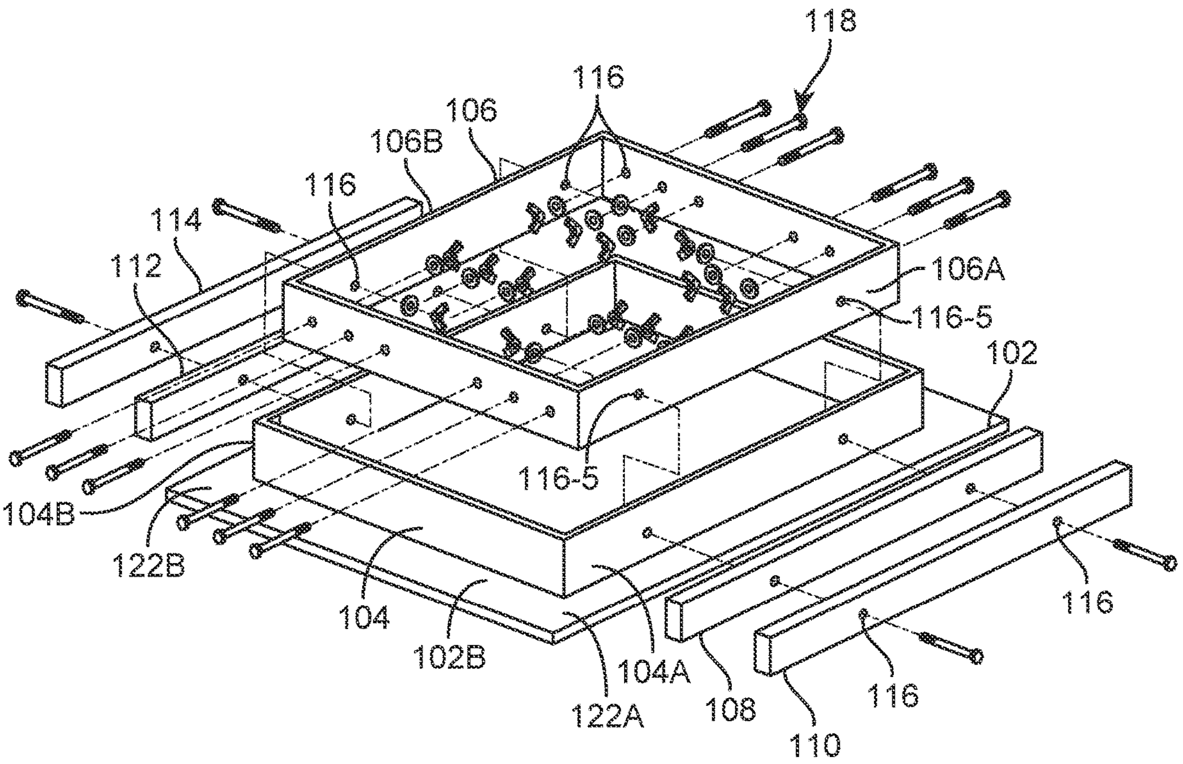
FIG. 9A exemplarily illustrates an exploded view of the convertible table of FIG. 1 in storage configuration.
Figure 9B:
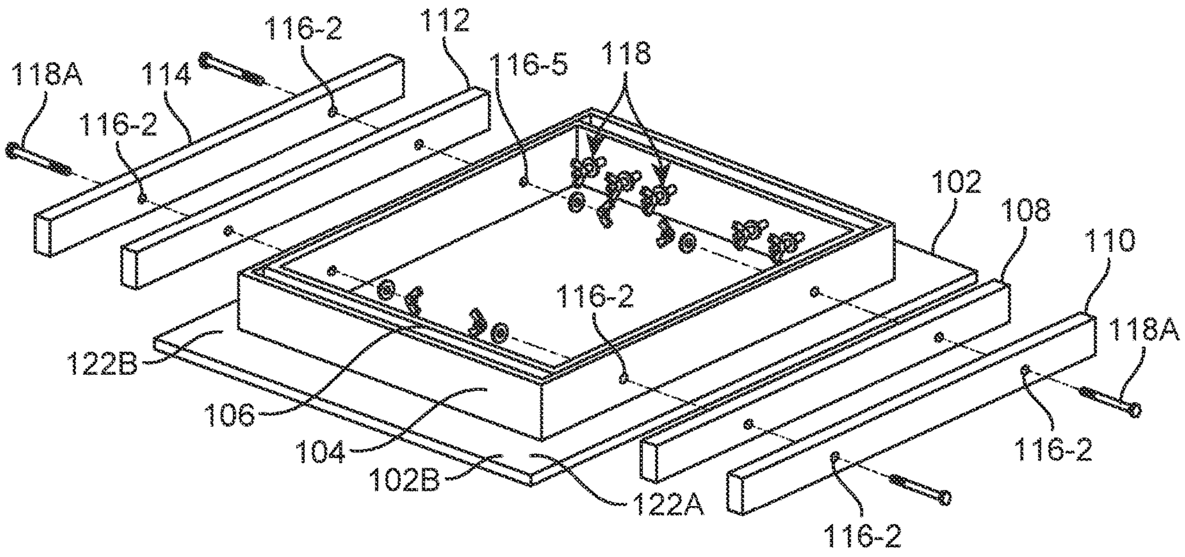
FIG. 9B exemplarily illustrates an exploded view of the convertible table and the plurality of legs of FIG. 1 in storage configuration.

FIG. 9A exemplarily illustrates an exploded view of the convertible table 100 of FIG. 1 in storage configuration. FIG. 9B exemplarily illustrates an exploded view of the convertible table 100 and the plurality of legs 108, 110, 112, 114 of FIG. 1 in storage configuration. Referring to FIG. 9A, initially, in storage configuration, the plurality of legs 108, 110, 112, 114 are unfastened from the top frame 104 and the bottom frame 106. At next step, the bottom frame 106 is positioned within the top frame 104, shown in FIG. 9B. Referring to FIG. 9A and FIG. 9B, at another step, the first pair of legs 108, 110 are placed on a first space 122*a* on the bottom side 102*a* of tabletop 102 adjacent to the first side 104A of the top frame 104. The second pair of legs 112, 114 are placed on a second space 122*b* on the bottom side 102*a* of the tabletop 102 adjacent to the second side 104B of the top frame 104.

Accordingly, in exemplary embodiments, convertible worktable 100 is convertible into an assembled use configuration (FIG. 1, for example) and a storage configuration (FIG. 9B and FIG. 10, discussed below, for example), and includes: a plurality of legs such as legs 108, 110, 112, 114, and a plurality of fasteners 118, 118A; a top frame unit including a planar tabletop 102 and a top frame 104 attached underneath the planar tabletop 102, the top frame 104 having a top frame perimeter that is smaller and similar to a perimeter of the planar tabletop 102 such that a perimetrical surface 102C between the top frame and an edge of the planar tabletop 102 is formed, at least a portion of the perimetrical surface (for example surface 102B) configured to store the plurality of legs 108, 110, 112, 114 of the convertible worktable in the storage configuration and configured to provide space for clamps or mounting tools in the assembled use configuration.

In such exemplary embodiment, a first set of holes 116-1 may be disposed on a first set of opposite sides 104A and 104B of the top frame 104 so that the holes 116-1 align with a first set of holes 116-1 on a terminal end of each of the plurality of legs 108, 110, 112, and 114 to convert the convertible worktable 100 to the assembled use configuration.

Additionally, in such exemplary embodiment, a second set of holes 116-2 may be disposed on a second set of opposite sides 104D and 104C of the top frame 104 such that holes 116-2 align with a second set of holes 116-2 on a length of each of the legs 108, 110, 112, and 114 to convert the convertible worktable 100 to the storage configuration.

Moreover, such exemplary embodiment of convertible worktable 100 includes a removable bottom frame 106 having a bottom frame perimeter that is smaller and similar to the top frame perimeter, wherein: the bottom frame 106 is spaced apart and coaxial to the top frame 104 and a set of gaps 120 is formed between opposite sides of the removable bottom frame 106A, 106B and the top frame 104A, 104B. Furthermore, a third set of holes 116-3 may be disposed on the first set of opposite sides 106A and 106B of the bottom frame 106 so that holes 116-3 align with a fourth set of holes 116-4 on an opposite terminal end of each of the plurality of legs 108, 110, 112, and 114, when the convertible worktable 100 is converted to the assembled use configuration, and a fifth set of holes 116-5 may be disposed on a second set of opposite sides 106C and 106D of the bottom frame 106 so that holes 116-5 align with the second set of holes 116-2 of the top frame 104 when the convertible worktable is converted to the storage configuration.

In some exemplary embodiments, when the convertible worktable 100 is in the storage configuration, at least some of the plurality of fasteners 118A traverse through the second set of holes 116-2 on the length of each of the legs, the second set of holes 116-2 disposed on the second set of opposite sides of the top frame 104, and the fifth set of holes 116-5 disposed on the second set of opposite sides of the bottom frame 106 so that the plurality of legs is secured underneath the planar tabletop surface and attached to the top frame 104 and the bottom frame 106. (See for example FIG. 9A, FIG. 9B).

In some exemplary embodiments, when the convertible worktable 100 is in the assembled use configuration, at least some of the plurality of fasteners 118A traverse through the first set of holes 116-1 disposed on the first set of opposite sides of the top frame 104, and the first set of holes 116-1 on the terminal end of each of the plurality of legs so that the that the plurality of legs are vertically secured to the top frame 104 of the top frame unit of the convertible worktable 100. (See for example FIG. 2).

Figure 11:
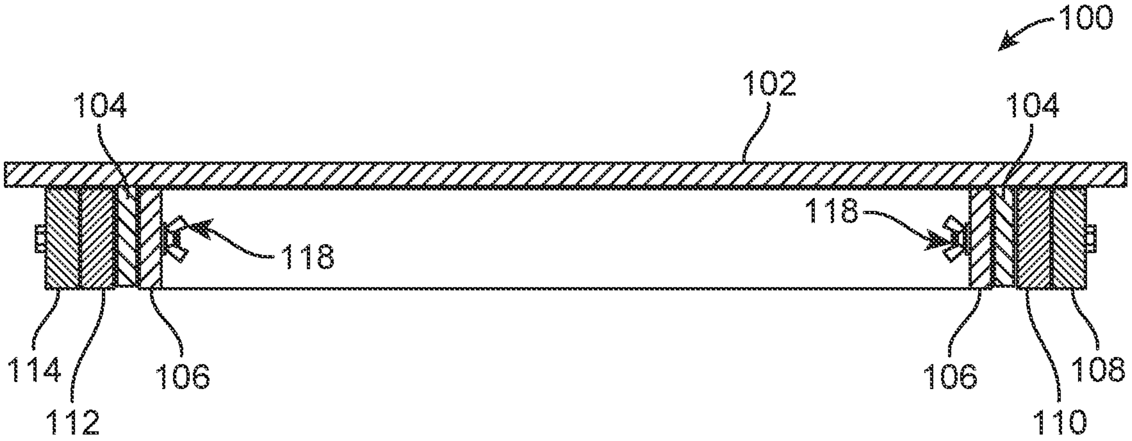
FIG. 11 exemplarily illustrates a cross-sectional view of the convertible table of FIG. 1 in storage configuration.

FIG. 10 exemplarily illustrates a bottom view of the convertible table of FIG. 1 in storage configuration. FIG. 11 exemplarily illustrates a cross-sectional view of the convertible table of FIG. 1 in storage configuration. The bottom frame 106 is positioned within the top frame 104. The first pair of legs 108, 110 are secured along at least one exterior side of the top frame 104 and the second pair of legs 112, 114 are secured along at least another exterior side of the top frame 104.

In one embodiment, the fastener assembly comprises at least twelve hex bolts 118*a* with wingnuts 118*b* and washers 118*c* that are used to rapidly attach the legs 108, 110, 112, 114 to the bottom frame 106 and the top frame 104 when assembling the worktable 100 in its assembled use configuration, and four hex bolts 118*a* with wingnuts 118*b* of longer size and washers 118*c* to convert the worktable 100 in its storage configuration.

In an example, to convert and assemble the worktable 100 from the storage configuration to the assembled use configuration, an approximate ten to fifteen minutes is spent. The worktable 100 is placed upside down on a flat level surface. At least two fastener members 118 at each side of the worktable 100 that secures the legs 108, 110, 112, 114 and the bottom frame 106 to the top frame 104 creating the storage configuration or storage configuration are removed. The legs 108, 110, 112, 114, the top frame 104 and the bottom frame 106 are set aside. At least eight fastener members 118 are used to fasten the legs 108, 110, 112, 114 to the top frame 102. In order to get the legs 108, 110, 112, 114 bolted on more tightly, a pair of common slip joint plies can be helpful to hold the heads of hex bolts 118*a* while further tightening the wingnuts 118*b* with the other hand. The washers 118C are helpful in keeping the wingnuts 118*b* and hex bolts 118*a* head from digging into the wood. Once the legs 108, 110, 112, 114 are installed at the top frame 104, four more fastener members 118 are removed from their storage holes 116 in the bottom frame 106 and used to the fasten the bottom frame 106 to the legs 108, 110, 112, 114. Once the assembly to assembled use configuration is completed, the four longer bolts 118*a* are used in the storage configuration may be stored in the storage holes 116 of the bottom frame 106 in order not to get lost. To convert from the assembled use configuration to the storage configuration, the worktable 100 is turned upside down. The legs 108, 110, 112, 114 and the bottom frame 106 are unbolted. Thereafter, the legs 108, 110, 112, 114 are fastened to the exterior side of the top frame 104 and the bottom frame 106 is secured within the top frame 104, and fastened together via fastener members 118. The unused fastener members 118 may be fastened in the unused fastening holes 116, also referred as storage holes 116, of the bottom frame 106 for storage purpose. Advantageously, the assembled use configuration provides a sturdy, cube-like worktable 100 structure. The storage configuration provides a single, rigid, and portable, space saving unit containing all the parts of the worktable 100.

To assist a user to properly and efficiently assemble the worktable into the storage configuration, a series of markings, such as for example, and without limiting the scope of the preset invention, markings A, B, C, and D, may be placed along a surface of the legs 112 and 114, and along a surface of the top frame 104 and bottom frame 106 in manner that guides the user as to the order, alignment, or placement of each of these components against the bottom surface of tabletop 102. Of course, markings A, B, C, and D may be letters, numbers, symbols, and may line us as shown or displayed in any other manner so as to provide guidance to the user. In the shown embodiment, the markings comprise of lines that line up when the individual pieces or components are properly installed.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A convertible worktable that is convertible into an assembled use configuration and a storage configuration, comprising:

a plurality of legs and a plurality of fasteners;

a top frame unit including a planar tabletop surface and a top frame attached underneath the planar tabletop surface, the top frame having a top frame perimeter that is smaller and similar to a perimeter of the planar tabletop surface such that a perimetrical surface between the top frame and an edge of the planar tabletop surface is formed, at least a portion of the perimetrical surface configured to store the plurality of legs of the convertible worktable in the storage configuration and configured to provide space for clamps or mounting tools in the assembled use configuration, wherein:

a first set of holes disposed on a first set of opposite sides of the top frame align with a first set of holes on a terminal end of each of the plurality of legs to convert the convertible worktable to the assembled use configuration, and a second set of holes disposed on a second set of opposite sides of the top frame align with a second set of holes on a length of each of the legs to convert the convertible worktable to the storage configuration; and a removable bottom frame having a bottom frame perimeter that is smaller and similar to the top frame perimeter, wherein:

the bottom frame is spaced apart and coaxial to the top frame and a set of gaps is formed between opposite sides of the removable bottom frame and the top frame;

a third set of holes disposed on a first set of opposite sides of the bottom frame align with a fourth set of holes on an opposite terminal end of each of the plurality of legs when the convertible worktable is converted to the assembled use configuration, and a fifth set of holes disposed on a second set of opposite sides of the bottom frame align with the second set of holes of the top frame when the convertible worktable is converted to the storage configuration;

wherein, in the storage configuration, at least some of the plurality of fasteners traverse through the second set of holes on the length of each of the legs, the second set of holes disposed on the second set of opposite sides of the top frame, and the fifth set of holes disposed on the second set of opposite sides of the bottom frame so that the plurality of legs are secured underneath the planar tabletop surface and attached to the top frame and the bottom frame; and wherein, in the assembled use configuration, at least some of the plurality of fasteners are traverse through the first set of holes disposed on the first set of opposite sides of the top frame and the first set of holes on the terminal end of each of the plurality of legs so that the that the plurality of legs are vertically secured to the top frame of the top frame unit of the convertible worktable.

2. The convertible worktable of claim 1, wherein the top frame and the bottom frame are of a rectangular configuration.

3. The convertible worktable of claim 1, wherein the top frame and the bottom frame are in a square configuration.

4. The convertible worktable of claim 1, wherein the set of gaps comprise of a free space on a bottom surface of the planar tabletop alongside the first set of opposite sides of the top frame.

5. The convertible worktable of claim 1, wherein the set of gaps comprise of a free space on a bottom surface of the planar tabletop alongside the second set of opposite sides of the top frame.

6. The convertible worktable of claim 1, wherein, in the storage configuration, the second set of opposite sides of the bottom frame fit snugly against and alongside the second set of opposite sides of the top frame and the first set of opposite sides of the bottom frame is spaced apart from the first set of opposite sides of the top frame by a length equal to or greater than a width of two of the plurality of legs.

7. The convertible worktable of claim 1, wherein, in the assembled use configuration, the bottom frame is coupled to inward facing sides of a pair of the plurality of legs on the first or second set of opposite sides of the bottom frame and the bottom frame is measured to be equal to a length of an interior perimeter of the top frame on the second or first set of opposite sides of the bottom frame, respectively.

8. The convertible worktable of claim 1, wherein the fastener assembly comprises a plurality of hex bolts with wingnuts and washers.

9. The convertible worktable of claim 1, wherein the first set of holes disposed on the first set of opposite sides of the top frame include two holes diagonally aligned at terminal ends of each of the first set of opposite sides.

10. The convertible worktable of claim 1, wherein the second set of holes disposed on the second set of opposite sides of the top frame include two holes along a center region of the second set of opposite sides of the top frame.

11. A convertible worktable that is convertible into an assembled use configuration and a storage configuration, comprising:

a plurality of legs and a plurality of fasteners;

a top frame unit including a planar tabletop surface and a top frame attached underneath the planar tabletop surface, the top frame having a top frame perimeter that is smaller and similar to a perimeter of the planar tabletop surface such that a perimetrical surface between the top frame and an edge of the planar tabletop surface is formed, at least a portion of the perimetrical surface configured to store the plurality of legs of the convertible worktable in the storage configuration and configured to provide space for clamps or mounting tools in the assembled use configuration, wherein:

a first set of holes disposed on a first set of opposite sides of the top frame align with a first set of holes on a terminal end of each of the plurality of legs to convert the convertible worktable to the assembled use configuration, and a second set of holes disposed on a second set of opposite sides of the top frame align with a second set of holes on a length of each of the legs to convert the convertible worktable to the storage configuration; and a removable bottom frame having a bottom frame perimeter that is smaller and similar to the top frame perimeter, wherein:

the bottom frame is spaced apart and coaxial to the top frame and a set of gaps is formed between opposite sides of the removable bottom frame and the top frame;

a third set of holes disposed on a first set of opposite sides of the bottom frame align with a fourth set of holes on an opposite terminal end of each of the plurality of legs when the convertible worktable is converted to the assembled use configuration, and a fifth set of holes disposed on a second set of opposite sides of the bottom frame align with the second set of holes of the top frame when the convertible worktable is converted to the storage configuration.

12. The convertible worktable of claim 11, wherein, in the storage configuration:

at least some of the plurality of fasteners traverse through the second set of holes on the length of each of the legs, the second set of holes disposed on the second set of opposite sides of the top frame, and the fifth set of holes disposed on the second set of opposite sides of the bottom frame so that the plurality of legs is secured underneath the planar tabletop surface and attached to the top frame and the bottom frame.

13. The convertible worktable of claim 11, wherein, in the assembled use configuration:

at least some of the plurality of fasteners are traverse through the first set of holes disposed on the first set of opposite sides of the top frame, and the first set of holes on the terminal end of each of the plurality of legs so that the that the plurality of legs are vertically secured to the top frame of the top frame unit of the convertible worktable.

14. The convertible worktable of claim 11, wherein the top frame and the bottom frame are of a rectangular configuration.

15. The convertible worktable of claim 11, wherein the top frame and the bottom frame are in a square configuration.

16. The convertible worktable of claim 11, wherein the plurality of legs consist of four legs.

17. The convertible worktable of claim 16, wherein each of the four legs include five holes, including the first set of holes consisting of two holes at the terminal end of each of the legs, two holes along the length of each of the legs, and a single hole at the opposite terminal end of each of the legs.

18. The convertible worktable of claim 11, wherein, in the storage configuration, the second set of opposite sides of the bottom frame fit snugly against and alongside the second set of opposite sides of the top frame and the first set of opposite sides of the bottom frame is spaced apart from the first set of opposite sides of the top frame by a length equal to or greater than a width of two of the plurality of legs.

19. The convertible worktable of claim 11, wherein, in the assembled use configuration, the bottom frame is coupled to inward facing sides of a pair of the plurality of legs on the first or second set of opposite sides of the bottom frame and the bottom frame is measured to be equal to a length of an interior perimeter of the top frame on the second or first set of opposite sides of the bottom frame, respectively.

20. The convertible worktable of claim 11, wherein the fastener assembly comprises a plurality of hex bolts with wingnuts and washers.

* * * * *